United States Patent [19]

Hanscom

[11] Patent Number: 4,626,631
[45] Date of Patent: Dec. 2, 1986

[54] DUAL LINE ADAPTER FOR TELEPHONE ANSWERING MACHINE

[75] Inventor: Bradford E. Hanscom, Downey, Calif.

[73] Assignee: Fortel, Inc., Compton, Calif.

[21] Appl. No.: 738,289

[22] Filed: May 28, 1985

[51] Int. Cl.$^4$ .................. H04M 1/64; H04M 11/10
[52] U.S. Cl. ............................. 379/165; 379/82; 379/372; 379/442
[58] Field of Search .................. 179/2 C, 6.13, 6.16, 179/84 R, 81 R, 99 E, 37, 38, 39

[56] References Cited

U.S. PATENT DOCUMENTS 3,679,831  7/1972  Bonsky ........................... 179/2 C
4,515,995  5/1985  Bolick, Jr. et al. .............. 179/6.13

Primary Examiner—James L. Dwyer
Attorney, Agent, or Firm—Keith D. Beecher

[57] ABSTRACT

An adapter circuit and system for coupling a telephone answering machine to two telephone lines. The adapter may be set so that the telephone answering machine will answer one or the other of the telephone lines, as determined by setting a mode selector switch to an "automatic" position; so that the telephone answering machine will answer only one of the telephone lines as determined by setting the mode selector switch to a "Line #1" position, or so that the telephone answering machine will answer only the other of the telephone lines by setting the mode selector switch to the "Line #2" position.

3 Claims, 1 Drawing Figure

DUAL LINE ADAPTER FOR TELEPHONE ANSWERING MACHINE

BACKGROUND OF THE INVENTION

Telephone answering machines have been provided which are capable of responding to ring signals received over a telephone line, and for effectively answering the call represented by the ring signals. This is achieved by the machine causing a recorded announcement message to be transmitted over the telephone line to the calling party, after which the calling party has an opportunity to record his message on a magnetic message recording tape in the answering machine.

A problem which has been encountered in the past is that of providing a telephone answering machine which is capable of answering calls received over more than one telephone line. A machine which has the ability of answering more than one telephone line is of a definite advantage, since it usually is not economical to provide a separate answering machine for each telephone line. Because of this, complex switching arrangements have been promulgated in the past for enabling a single telephone answering machine to answer more than one telephone line. However, these prior art coupling systems have proven to be excessively complex and expensive.

U.S. Pat. No. 3,679,831 which issued July 25, 1972, and which has been assigned to the present Assignee, discloses and claims one type of multi-line coupling system, and which enables a single telephone answering machine to be used in conjunction with more than one telephone line. However, the coupling system disclosed in the patent requires rather extensive changes to be made to the telephone answering machine itself.

The primary objective of the present invention is to provide a simple and inexpensive adapter circuit and system which may be used to couple a telephone answering machine to more than one telephone line, and which requires a minimum amount of modification, if any, to the telephone answering machine itself.

DETAILED DESCRIPTION OF THE ILLUSTRATED EMBODIMENT

Figure 1:
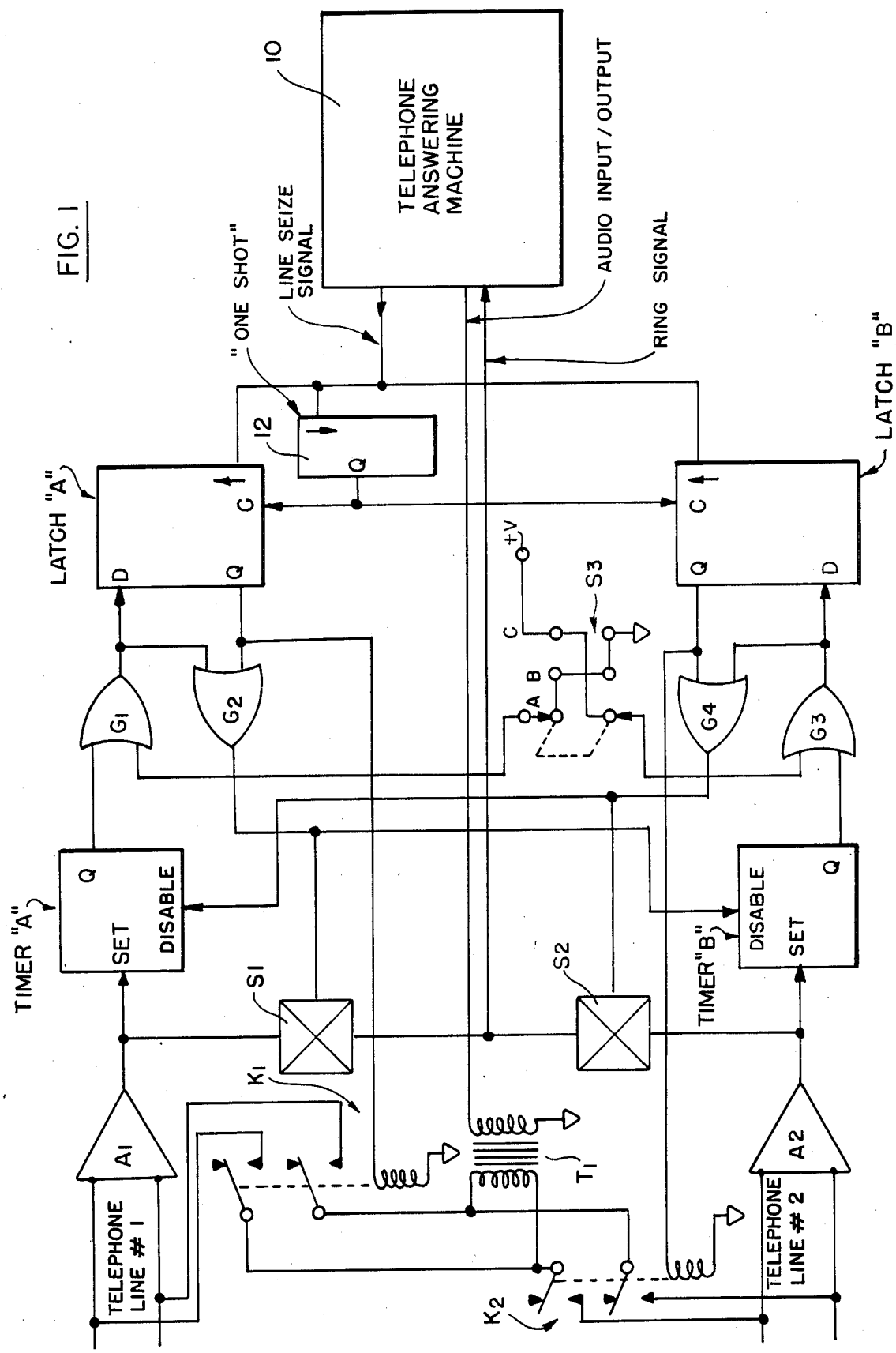
FIG. 1 is a circuit diagram of an adapter circuit and system constructed in accordance with one embodiment of the invention, and which may be used to couple a telephone answering machine to two telephone lines, so that the telephone answering machine is adapted to answer calls received over either of the two lines.

The adapter circuit of FIG. 1 is interposed between a telephone answering machine 10 and first and second telephone lines designated Telephone Line #1 and Telephone Line #2. The telephone answering machine includes a transformer T1 which serves to couple the machine to the either of two telephone lines, and which transmits audio signals from the telephone lines to the telephone answering machine, and which also serves to couple audio signals from the telephone answering machine to the telephone lines.

The telephone answering machine 10 also includes a ring detect circuit 12 which senses ring signals received over the telephone lines, and which responds to such ring signals to energize a line seize relay K1 or K2 which closes a pair of contacts to connect the transformer T1 to the telephone lines.

The adapter circuit and system shown in FIG. 1 serves to couple the telephone answering machine 10 to the two telephone lines with a minimum, if any, modifications being required to the telephone answering machine itself.

The adapter circuit and system includes a pair of operational amplifiers designated $A_1$ and $A_2$ which are connected respectively to the tip and ring leads of the telephone lines Nos. 1 and 2. Amplifier $A_1$ is connected to the set input of a Timer "A" and to a switch S1. Amplifier $A_2$ is connected to the set input of a Timer "B" and to a switch S2. The Q output of Timer "A" is connected to an "OR" gate G1, and the Q output of Timer "B" is connected to an "OR" gate G3. The "OR" gate G1 is connected to the D input of a data latch designated Latch "A" and to an "OR" gate G2. The "OR" gate G3 is connected to the D input of a data latch designated Latch "B" and to "OR" gate G4. The Q output of Latch "A" is connected to "OR" gate G2 and line seize relay K1, and the Q output of Latch "B" is connected to "OR" gate G4 and line seize relay K2. The "OR" gate G2 is connected to switch S1 and to a Disable input of Timer "B". The "OR" gate G4 is connected to switch S2 and to a Disable input of Timer "A". The common junction of switches S1 and S2 is connected to ring detect circuit of the telephone answering machine 10. The line seize signal from the telephone answering machine 10 is also connected to the latch inputs of the data latches "A" and "B".

The adapter circuit and system also includes a mode switch S3 which is connected to "OR" gates G1 and G3, as shown, and is also connected to ground and to the positive terminal of a voltage source $+V$.

When the mode switch S3 is in its illustrated position "A", timer "A" is disabled, and the telephone answering machine responds only to calls received on Telephone Line #2. If swich S3 is in position "B", when a ring signal is received on Telephone Line #1, it sets Timer "A" to, for example, 10 seconds. During this 10 second interval, the ring signals are passed through switch S1 to the ring detect circuit, and the telephone answering machine 10 responds to the ring signals to seize Telephone Line #1 through latch "A" and the contacts of seize relay K1 and causing the switch S1 to be latched closed so long as the seize signal continues. At the end of the telephone call, the seize signal is discontinued and the adapter circuit and "one shot" 12 causes the system to be restored to its original state.

When the mode switch S3 is set to the "C" position, the adapter causes the telephone answering machine to respond only to telephone calls received over Telephone Line #1, and the operation is similar to that described above.

When the mode switch is set to position "B", the adapter system enables the telephone answering machine to answer calls received on either Telephone Line #1 or Telephone Line #2. When a call is received on either of the lines, the telephone answering machine 10 will respond to the call received on that line, and will disable the machine, insofar as any call received on the other line is concerned, until the termination of the call received on Telephone Line #1.

When a call is received on Telephone Line 1, the operation is as described above, with the switch S1 being closed to introduce the ring signal to the ring detect circuit, and which results in Latch "A" latching the switch S1 closed for the duration of the call, and causing relay K1 to seize Telephone Line #1. At the same time, a disable signal is applied to Timer "B" preventing the timer from being actuated. At the end of the call on Telephone Line #1, the system is restored to its original condition, and is capable of answering a second call received on Telephone Line #1, or a call received on Telephone Line #2.

Should a call be received on Telephone Line #2, switch S2 is closed due to the operation of Timer "B". When ringing requirements have been satisfied, the answering machine 10 will provide a "line seize" signal. This will cause the data at the "D" input or latch "B" to be applied to "Q" and held for the duration of the call. This "Q" output is used to accomplish line seize via relay K2 and provide telephone line voltage information to the answering machine via S2. At the conclusion of the call the "line seize" signal from the answering machine will be removed and cause "one shot" circuit 12 to reset the data latches "A" and "B" to their inactive states. This will then release switch S2, relay K2 and thus release line seize.

The invention provides, therefore, an adapter system and circuit, such as shown in FIG. 1, which may be connected to the telephone answering machine 10 with a minimum of modification to the circuit of the telephone answering machine itself, and which is effective to enable the telephone answering machine to respond to calls received on Telephone Line #1 or Telephone Line #2. Also, the system and circuit shown in FIG. 1 is relatively simple in its conception, and relatively inexpensive to construct.

It will be appreciated that while a particular embodiment of the circuit and system of the present invention have been illustrated and described, modifications may be made. It is intended in the claims to cover all modifications which come within the true spirit and scope of the invention.

I claim:

1. An adapter circuit and system for coupling a telephone answering machine to first and second telephone lines, said telephone answering machine including a coupling circuit for transmitting audio signals between the first and second telephone lines and the telephone answering machine, and a line seizure relay circuit included in said coupling circuit responsive to a line seize signal from the telephone answering machine for connecting the coupling circuit to the first and second telephone lines, said adapter circuit and system including: a first input circuit adapted to be connected to the first telephone line for producing a first output signal in response to a first ring signal received thereby over the first telephone line; a second input circuit adapted to be connected to the second telephone line for producing a second output signal in response to a second ring signal received thereby over the second telephone line; first switching means connected to the first input circuit and responsive to said first output signal for enabling said first input circuit to introduce the first ring signal received thereby to the telephone answering machine; second switching means connected to the second input circuit and responsive to said second output signal for enabling said second input circuit to introduce the second ring signal received thereby to the telephone answering machine; first latching circuit responsive to said line seizure signal from the telephone answering machine to latch said first switching means closed following the occurrence of the first output signal; a second latching circuit responsive to said line seizure signal from the telephone answering machine to latch said second switching means closed following the occurrence of the second output signal; and disabling circuitry interconnecting said first and second input circuits to prevent the closure of either one of said switching means when the other has been latched closed.

2. The adapter circuit and system defined in claim 1, and which includes a timer in each of said input circuits for establishing a predetermined duration of the output signals produced thereby.

3. The adapter circuit and system defined in claim 2, and which includes circuit means including a mode switch settable to a first position to enable the adapter to respond only to ring signals received over the first telephone line, settable to a second position to enable the adapter to respond only to ring signals received over the second telephone line, and settable to a third position to enable the adapter to respond to ring signals received over either the first or second telephone lines.

* * * * *